United States Patent
Alexander et al.

(10) Patent No.: US 9,941,773 B2
(45) Date of Patent: Apr. 10, 2018

(54) ACTUATOR WITH ELECTRIC MOTOR AND EMI REDUCTION CIRCUIT

(71) Applicant: Johnson Controls Technology Company, Holland, MI (US)

(72) Inventors: Robert Alexander, Menomonee Falls, WI (US); Robert Freimuth, Greenfield, WI (US); James Wanasek, West Allis, WI (US); Ralph Arndt, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 380 days.

(21) Appl. No.: 14/748,081

(22) Filed: Jun. 23, 2015

(65) Prior Publication Data

US 2015/0295475 A1   Oct. 15, 2015

Related U.S. Application Data

(63) Continuation of application No. 13/539,077, filed on Jun. 29, 2012, now Pat. No. 9,077,232.

(51) Int. Cl.
| | |
|---|---|
| *H02K 11/00* | (2016.01) |
| *H02K 11/02* | (2016.01) |
| *H02K 11/01* | (2016.01) |

(52) U.S. Cl.
CPC ......... *H02K 11/0005* (2013.01); *H02K 11/01* (2016.01); *H02K 11/024* (2013.01)

(58) Field of Classification Search
CPC .. H02K 11/0005; H02K 11/01; H02K 11/024; H02K 11/02; H02K 11/0073; H02K 5/15; H02K 5/22; H02K 5/225; H02K 5/24
USPC ............................................ 310/71, 68 R, 89
See application file for complete search history.

(56) References Cited

U.S. PATENT DOCUMENTS

| | | | | |
|---|---|---|---|---|
| 2005/0023904 | A1* | 2/2005 | Cara ...................... | H02K 11/01 310/10 |
| 2006/0021176 | A1* | 2/2006 | Moein .................... | H02K 11/33 15/250.3 |
| 2007/0178720 | A1* | 8/2007 | Yoshida ................. | H02K 5/225 439/74 |
| 2007/0210672 | A1* | 9/2007 | Fleminger ............ | H02K 11/026 310/239 |

OTHER PUBLICATIONS

EEngineer, EMI/EMC Printed Circuit Board (PCB) Tips, http://www.radioing.com/eengineer/pcb-tips.html, retrieved on Oct. 15, 2013, 3 pages.

* cited by examiner

*Primary Examiner* — Michael Andrews
(74) *Attorney, Agent, or Firm* — Foley & Lardner LLP

(57) ABSTRACT

An actuator includes a circuit board having an electromagnetic interference (EMI) reduction circuit. The actuator includes a motor having a motor casing mounted on the circuit board. A portion of the motor casing contacts a surface of the circuit board. The actuator includes an electrical contact conductively coupled to the EMI reduction circuit and mounted on the surface of the circuit board. The electrical contact establishes a conductive path between the EMI reduction circuit and the motor casing when the motor casing is mounted on the circuit board.

18 Claims, 9 Drawing Sheets

ACTUATOR WITH ELECTRIC MOTOR AND EMI REDUCTION CIRCUIT

CROSS-REFERENCE TO RELATED PATENT APPLICATION

This application is a continuation of U.S. patent application Ser. No. 13/539,077, filed Jun. 29, 2012, the entirety of which is incorporated by reference herein.

BACKGROUND

A brushed direct current (DC) motor operates with a rotating set of wound wire coils. This rotating set of wound wire coils is often referred to as an armature. The wound wire coils act as an electromagnet with two poles. Permanent magnets are mounted around the armature such that when the poles of the armature pass the poles of the permanent magnets, they are either pushed or pulled in one direction or another. A commutator repeatedly reverses the direction of the electric current provided to the wound wire coils of the armature such that the poles of the armature repeatedly push or pull against the permanent magnets. The commutator reverses the polarity of the electric current as the poles of the armature pass the poles of the permanent magnets. Inertia keeps the motor moving in the intended direction while the polarity of the poles switches.

Brushed DC electric motors are often selected for applications where low cost motors or simple and inexpensive control are required. However, electromagnetic interference (EMI) can be an issue presented by brushed DC motors. Among other reasons for the interference, arcing within the motor case can cause some EMI. It is challenging and difficult to implement efficient and effective EMI reduction mechanisms.

SUMMARY

One embodiment of the invention relates to a circuit board for a brushed DC motor. The circuit board for the brushed DC motor includes an EMI reduction circuit and a mounting location for the brushed DC motor. The mounting location includes a resilient conductive member that is surface mounted on the circuit board at the mounting location. When the motor is mounted to the circuit board at the mounting location, the motor case contacts and at least slightly compresses the resilient conductive member, connecting the motor case to the EMI reduction circuit.

One embodiment of the invention relates to an actuator. The actuator includes a circuit board comprising an EMI reduction circuit. The actuator further includes a brushed DC motor for mounting on the circuit board and having a motor case. The actuator yet further includes a spring contact that is surface mounted on the circuit board such that when the motor is mounted to the circuit board, the motor case contacts and compresses the spring contact, conductively connecting the motor case to an EMI reduction circuit.

The spring contact may be a conductive tab. The conductive tab may be in the form of a bent strip of conductive material that forms a v-shape. The v-shape includes a first arm, a second arm, and a curved spring portion between the first arm and the second arm. The first arm is coupled to the surface of the circuit board via a solder connection to at least one conductive member that is the part of a conductive path to the EMI reduction circuit. A surface of the first arm is parallel to the surface of the circuit board and the second arm extends away from the surface board and toward the motor casing when the motor is mounted on the circuit board. The second arm includes an edge, a first portion between the curved spring portion and the edge, and a second portion forming the end of the second arm. The second portion forms the end of the second arm and includes a loop configured to help prevent the second arm from being compressed against the first arm.

In other embodiments, the spring contact includes a resilient body having a conductive member for conductively coupling the motor case to the EMI reduction circuit. A bottom of the motor case faces the circuit board. The bottom of the motor case is recessed relative to an outer rim extending about a periphery of the motor case. At least one portion of the spring contact extends up into the recess and touches the bottom of the motor case when the outer rim is held against a surface of the circuit board.

The EMI reduction circuit may include at least one capacitor conductively coupled to a ground plane of the circuit board. In many of the embodiments disclosed herein, the spring contact is not soldered or otherwise rigidly coupled to the motor case when the EMI reduction circuit is in use (e.g., conductively coupled to the motor case).

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Referring generally to the Figures, a circuit board for a brushed DC motor is shown and described. The circuit board for the brushed DC motor includes an EMI reduction circuit and a mounting location for the brushed DC motor. The mounting location includes a resilient conductive member that is surface mounted on the circuit board at the mounting location. When the motor is mounted to the circuit board at the mounting location, the motor case contacts and at least slightly compresses the resilient conductive member, connecting the motor case to the EMI reduction circuit.

Some existing actuators having brushed DC motors reduce EMI by referencing the case or housing to ground or connecting the case to an EMI reduction circuit. Such actuators generally include a grounding wire attachment from the EMI reduction circuit to the case of the motor. This generally required hand soldering of the connection points between the motor casing and the EMI reduction circuit. Hand soldering a wire coupled to the motor casing is challenging because the motor case can serve as a large mass heat sink. For this and other reasons, the solder connection might be unreliable. EMI in actuators having brushed DC motors has also been reduced by using a common mode choke and capacitors positioned directly on or across the terminals of the motor for conducting EMI filter. Such circuits can be somewhat effective, but have issues including low EMI reduction performance relative to the circuit cost.

Referring again to the Figures, a circuit board 10 for an actuator 50 (see FIG. 8A) is shown, according to an exemplary embodiment. A motor 36 (see FIGS. 4-6, FIG. 8B, and FIG. 9) is coupled to the circuit board 10 and to an electromagnetic interference reduction circuit provided on the circuit board 10. The connection to the EMI reduction circuit is made automatically via a spring contact 12 when the motor 36 is coupled to the circuit board 10.

Figure 9:
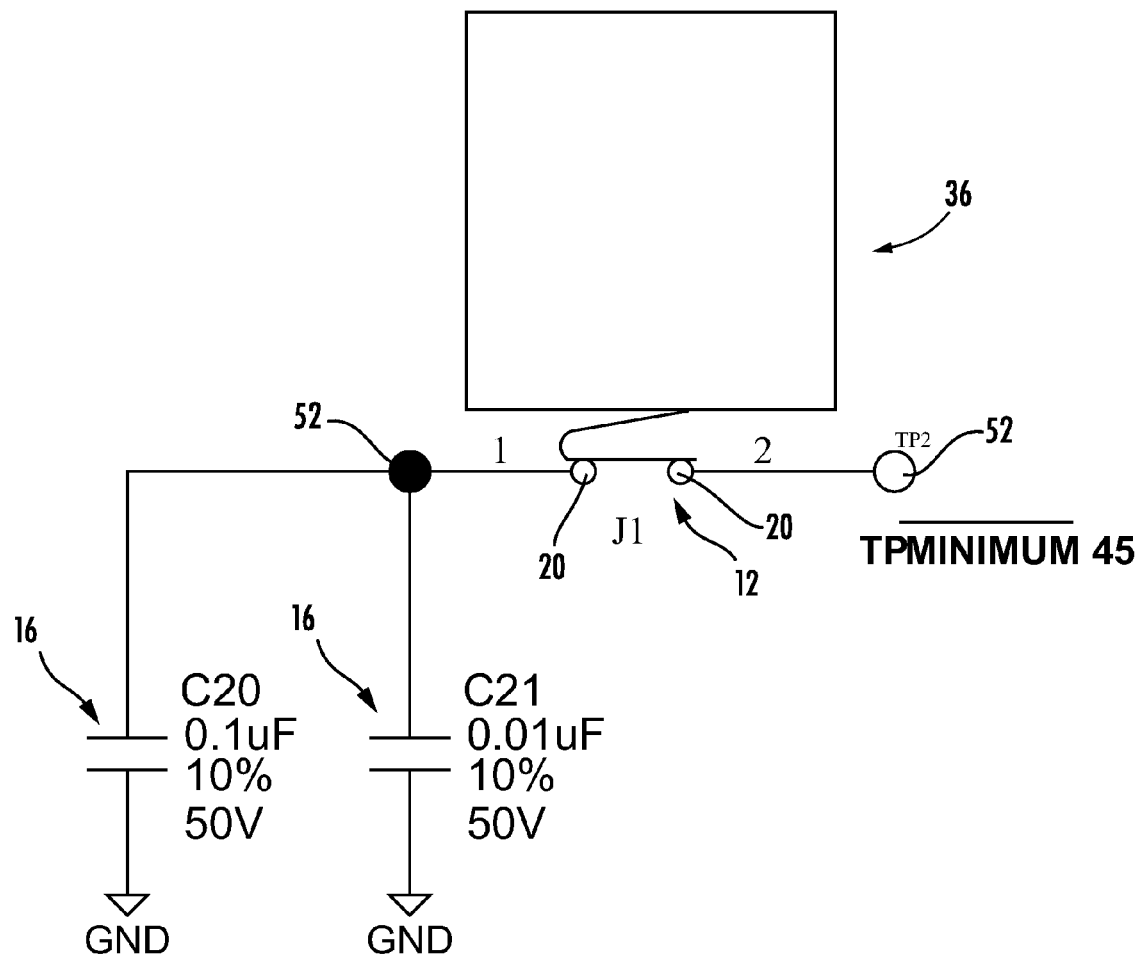
FIG. 9 is a diagram of an EMI circuit, in accordance with an exemplary embodiment.

The spring contact 12 (i.e., resilient member, resilient tab, spring tab, etc.) is coupled to the front side of the circuit board 10 in a motor footprint 14. The motor footprint 14 is an area corresponding with a mounting location of the motor 36. The spring contact 12 is coupled to the EMI circuit provided on the circuit board 10. In one embodiment, the EMI circuit includes one or more capacitors 16 that are referenced to ground. One exemplary EMI circuit is illustrated in FIG. 9 as including two capacitors 16, one with a capacitance of 0.1 μF and another with a capacitance of 0.01 μF and each connected to ground. The capacitance values of the capacitors utilized in the EMI reduction circuit may be varied to eliminate unwanted EMI emission peaks at certain frequencies (i.e., a band or bands of frequencies). In varying embodiments, any type or design of EMI reduction circuit may be closed by the motor casing coupling with the novel circuit board and spring contact of the present invention.

The motor footprint 14 defines an area on the circuit board 10 to which the motor 36 may be coupled. As shown, the motor footprint may be printed on the circuit board to clearly illustrate the proper motor mounting location to a user or manufacturer. Within the motor footprint 14, the circuit board 10 includes a pair of through-hole contacts 18 for the motor terminals 38 and two surface mount contacts 20 for the spring contact 12. The circuit board 10 is further shown to include an opening 22 (e.g. hole, aperture, bore, etc.) within the motor footprint 14 and configured to receive a boss or protrusion 40 extending from the bottom of the motor 36.

The spring contact 12 is a resilient, conductive member that is configured to allow the motor 36 to be coupled to the circuit board 10 (e.g., with a soldered connection between the terminals 38 and the contacts 18) and provide a conductive path between the motor 36's casing and the EMI reduction circuit (e.g., the capacitors 16 referenced to ground) with no additional assembly steps. The spring contact 12 is sized and shaped to apply a slight force to the bottom of the motor 36's casing that is sufficient to maintain contact between a portion of the spring contact 12 and the motor 36's casing to establish a conductive path between the motor 36's casing and the spring contact 12, but not so much force that the spring contact 12 interferes with the proper seating of the terminals 38 in the through-hole contacts 18 and the motor 36 on the motor footprint 14 of the circuit board 10.

According to an exemplary embodiment, the spring contact 12 is formed of a conductive metal such as copper or a copper alloy. In other embodiments, the spring contact may be another conductive material. In yet other embodiments, a non-conductive material can form the resilient member and a conductive material can complete the motor casing-to-EMI reduction circuit connection. For example, the resilient spring member may have a polymer body and a conductive trace or inlay that extends from the top of the resilient spring member and to a circuit board contact for the EMI reduction circuit.

The spring contact 12 is shown in the form of a strip that is bent into a V-shape with a first arm 24 and second arm with a first portion 28 and a second portion 30 integrally connected at an edge 34. The second portion 30 is connected to the first arm 24 with a curved spring portion 32. The first arm 24 is coupled to the surface contacts 20, such as by soldering. In an exemplary embodiment, the spring contact 12 is sized and shaped to function as a cantilever spring with the portions 28 and 30 moveable about the curved spring portion 32.

In an exemplary embodiment, the movement of the portions 28 and 30 (particularly portion 28) in a downward direction (e.g., toward first arm 24 and circuit board 10) is limited by the contact of a curved end 26 and the top surface of first arm 24. This limit may prevent the curved spring portion 32 from permanently creasing or otherwise losing its resiliency.

The resilience of the spring contact 12 may be changed by varying different properties according to varying embodiments. For example, the resilience (i.e., spring constant) may be changed by varying the material of the spring contact 12, the cross-section of the strip forming the spring contact 12, and/or the diameter of the spring portion 32.

Figure 4:
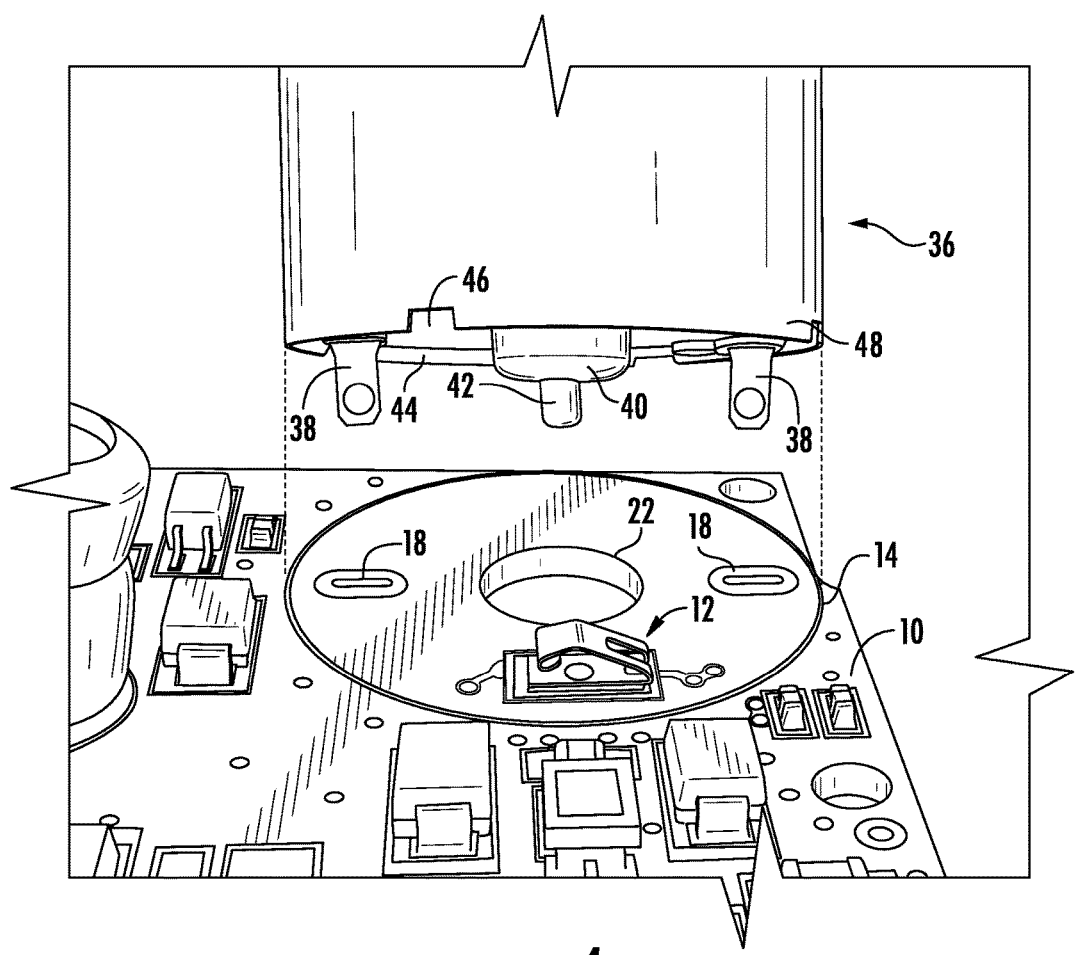
FIG. 4 is an exploded perspective view of a motor and the circuit board of FIG. 1, in accordance with an exemplary embodiment.
Figure 5:
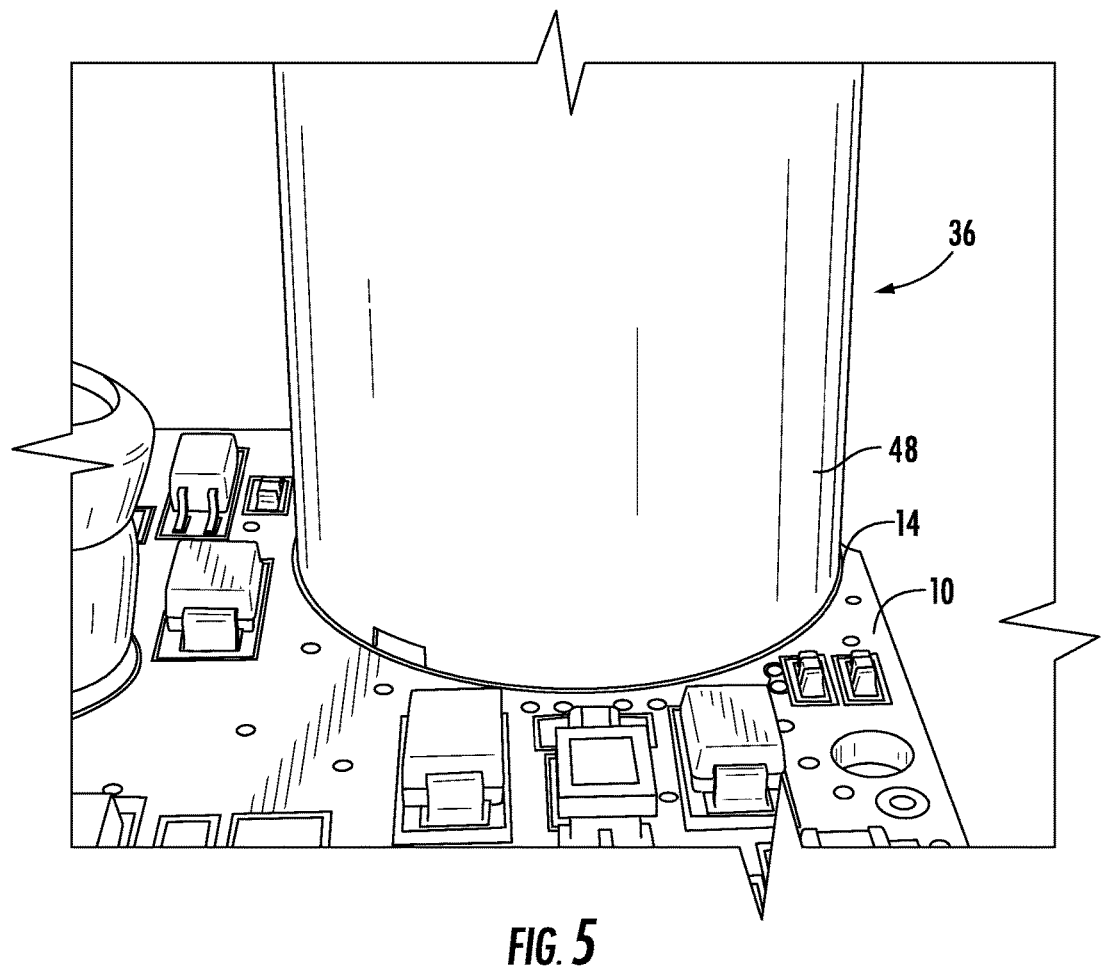
FIG. 5 is a perspective view of a motor coupled to the circuit board of FIG. 1, in accordance with an exemplary embodiment.
Figure 6:
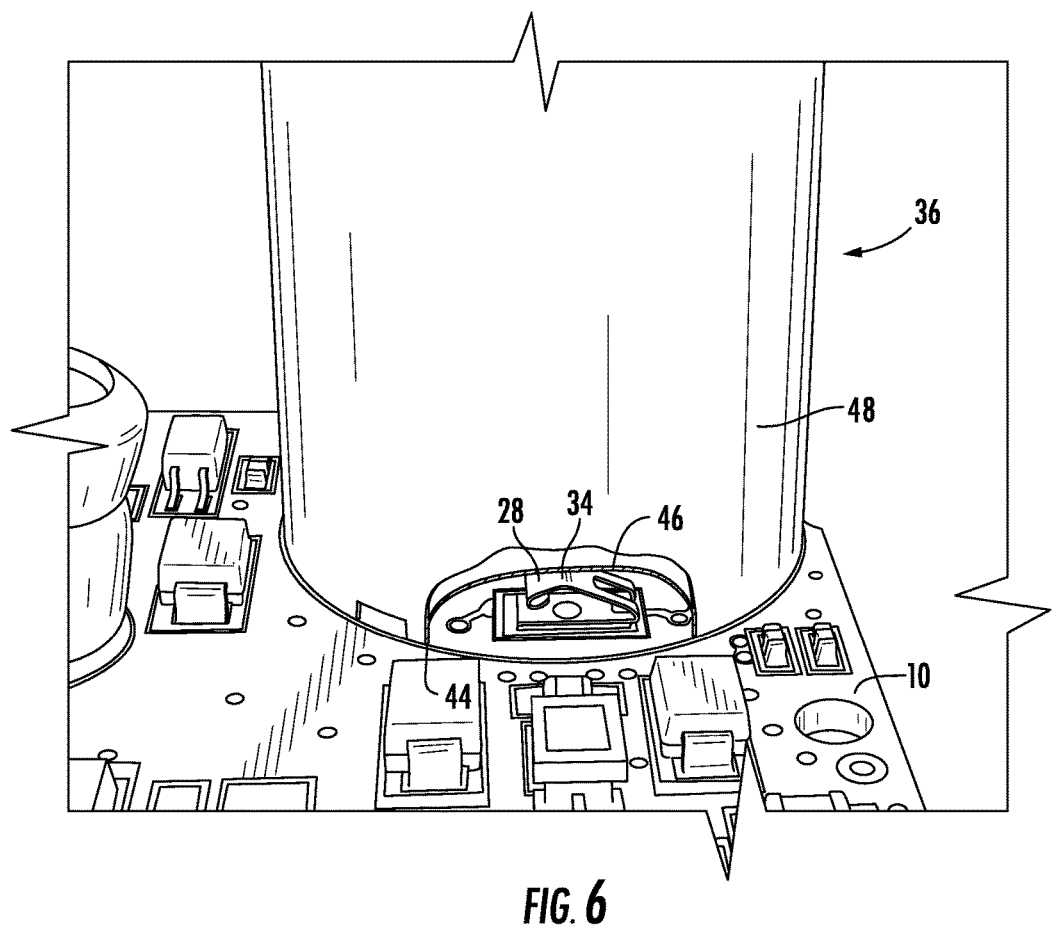
FIG. 6 is a partially broken perspective view of a motor coupled to the circuit board of FIG. 1, in accordance with an exemplary embodiment.

Referring now to FIGS. 4-6, the bottom 46 of the motor 36 is shown to be a recessed structure with an outer rim 44 extending about the periphery of the motor case or housing 48. A conductive path is formed between the motor case 48, the rim 44 and the bottom 46. A protrusion 40 surrounding an end of the output shaft 42 extends from the bottom 46. The protrusion 40 is received in the opening 22 in the motor footprint 14, which allows the protrusion 40 to pass through the circuit board 10 and the rim 44 to rest on the surface of the circuit board 10. The terminals 38 are blade-like structures extending from the bottom 46 and aligned with the through-hole contacts 18. The terminals 38 may be otherwise shaped such as pin-shaped. In one embodiment, the terminals 38 are provided symmetrically on either side of the protrusion 40. In other embodiments, the terminals 38 and the contacts 18 may be otherwise arranged, such as to one side of the protrusion 40.

The spring contact 12 is aligned with a portion of the bottom 46 and does not obstruct the insertion of the terminals 38 into the contacts 18 or the protrusion 40 into the opening 22. The spring contact 12 has a height that is greater than the height of the rim 44. When the motor 36 is fully seated on the motor footprint 14 of the circuit board 10 and the rim 44 contacts the surface of the circuit board 10, the spring contact 12 is therefore contacted by and compressed by the bottom 46. In other words, the resilient properties of the spring contact 12 force at least a portion of the second arm against the surface of the bottom 46 to conductively couple the motor case 48 to the EMI reduction circuit. In one embodiment, the edge 34 of the spring contact 12 contacts the bottom 46 of motor casing 48, as shown in FIG. 6. In another embodiment, the first portion 28 or the second portion 30 of the arm may also or alternatively contact the bottom 46 of the casing 48.

Unlike other types of contact, such as a solder ring on the circuit board 10 or a grounding wire, the spring contact 12 couples the motor 36 to the EMI circuit without the need for an additional manufacturing or assembly step. Moreover, the spring contact 12 couples the motor 36 to the EMI circuit without the need for a rigid mechanical coupling (e.g., one or more solder points, one or more wires soldered or screwed to the casing, etc.).

Figure 7A:
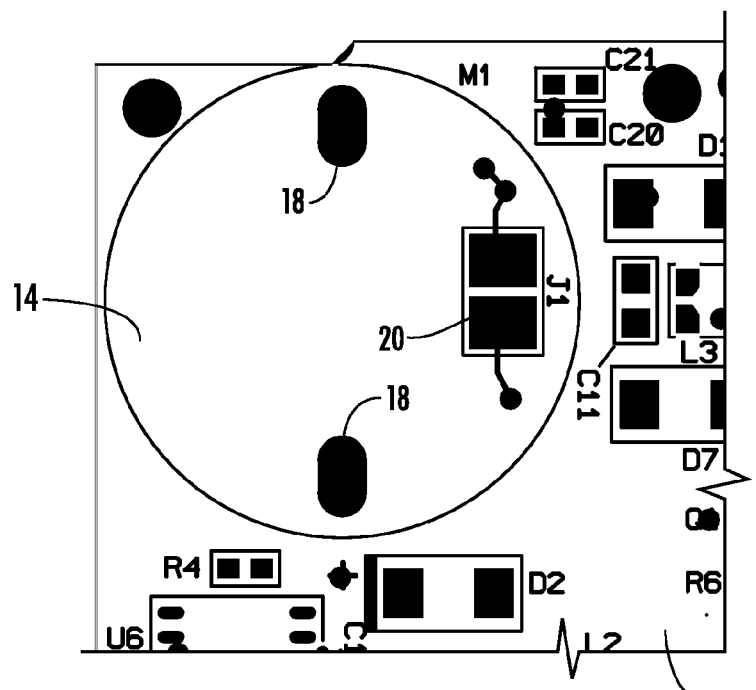
FIG. 7A is a schematic top view of the circuit board of FIG. 1.
Figure 7B:
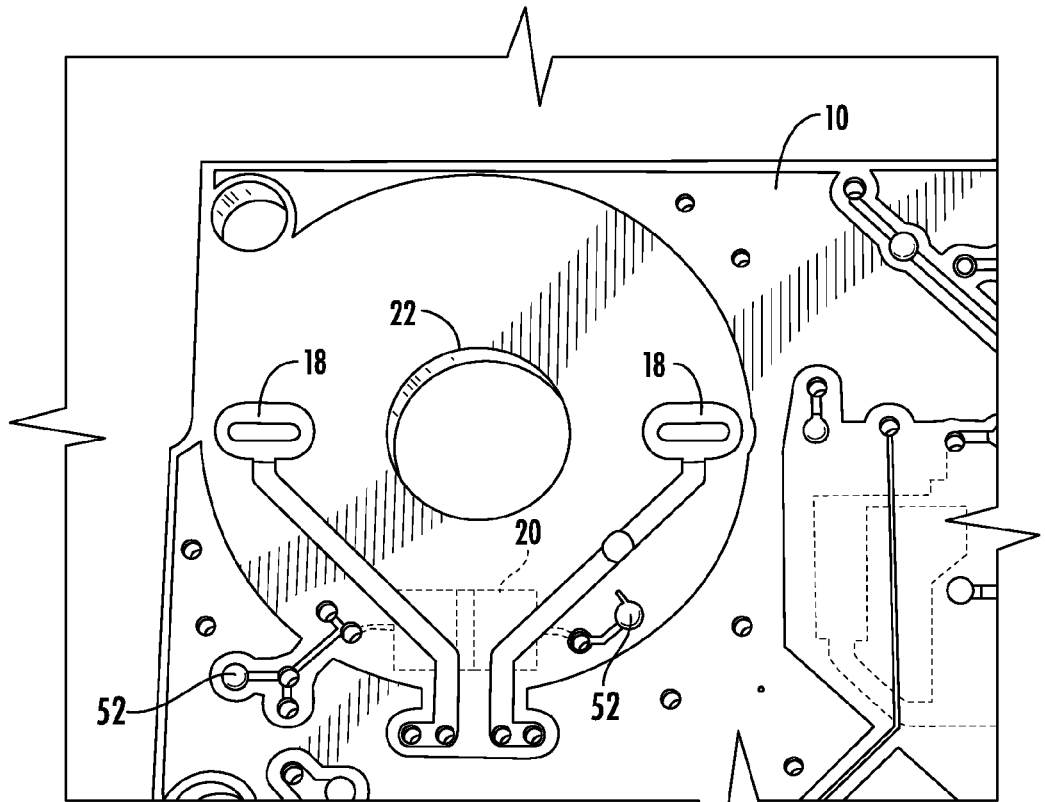
FIG. 7B is a bottom perspective view of the circuit board of FIG. 1.

Referring now to FIG. 7B, a pair of test points 52 are provided on the circuit board 10. The test points 52 are shown as points in the EMI circuit on both side of the spring contact 12 and each is coupled to one of the surface mount contacts 20. The test points 52 allow for a continuity check to be performed to ensure that there is proper contact between the spring contact 12 and the bottom 46 of the motor 36. In an exemplary embodiment, the test points 52 may also be used for other testing or tuning purposes.

While the spring contact 12 is shown as a v-shape, the spring contact 12 may be otherwise shaped. For example, the second arm may be curved instead of having multiple angles surfaces. In other embodiments, the second arm may be coupled to the first arm on either side with a spring portion (e.g., in place of a free end 26). In still other embodiments, the spring contact 12 may be a coil spring or a flat washer-shaped spring such as a Belleville washer, spring washer, or wave spring.

While the spring contact 12 is shown as being surface mounted to a surface contact 20, in other embodiments, the spring contact 12 may be include an extension or lead that is coupled to a through-hole contact.

While only a single contact 12 is shown in the figures, in another embodiment the circuit board 10 may include two or more spring contacts 12 disposed in the motor footprint 14 and configured to contact the bottom 46 of the motor 36. For example, a second spring contact may be provided on the opposite side of the opening 22 from the first spring contact to reduce the torque applied to the connection (e.g., a soldered connection) between the terminals 38 and the contacts 18. If multiple spring contacts are utilized, the spring contacts may be configured to have a lower spring constant than that of a single spring contact. Multiple spring contacts may be connected in parallel and each be coupled to the EMI reduction circuit such that contact with any of the spring contacts will couple the case 48 of the motor 36 to the EMI reduction circuit.

Figure 1:
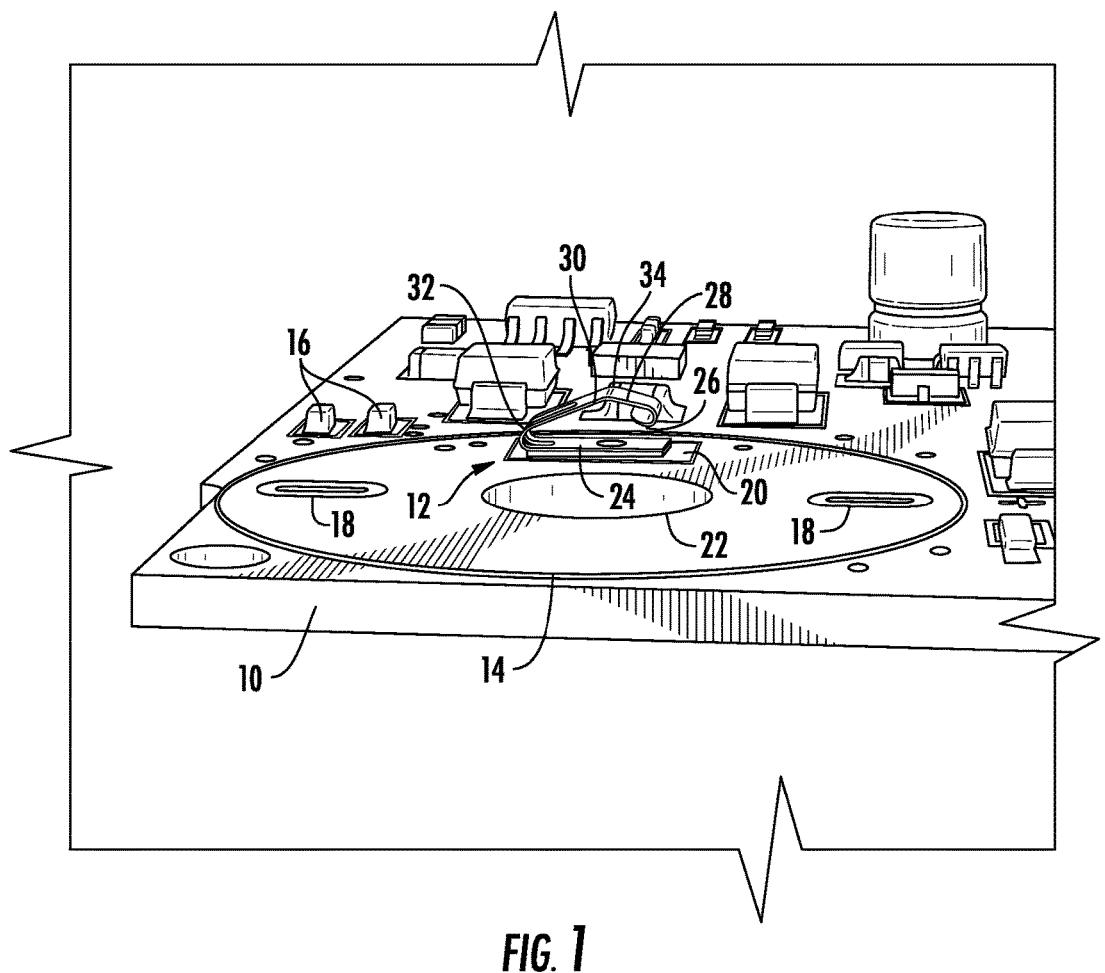
FIG. 1 is a perspective view of a circuit board for an actuator, in accordance with an exemplary embodiment.

FIG. 1 is a front perspective view of the circuit board 10 for the actuator 50, in accordance with an exemplary embodiment. The spring contact 12 is shown disposed in the motor footprint 14 to one side of a central opening 22. The spring contact 12 is surface mounted to contacts 20 on the top face of the circuit board 10.

Figure 2:
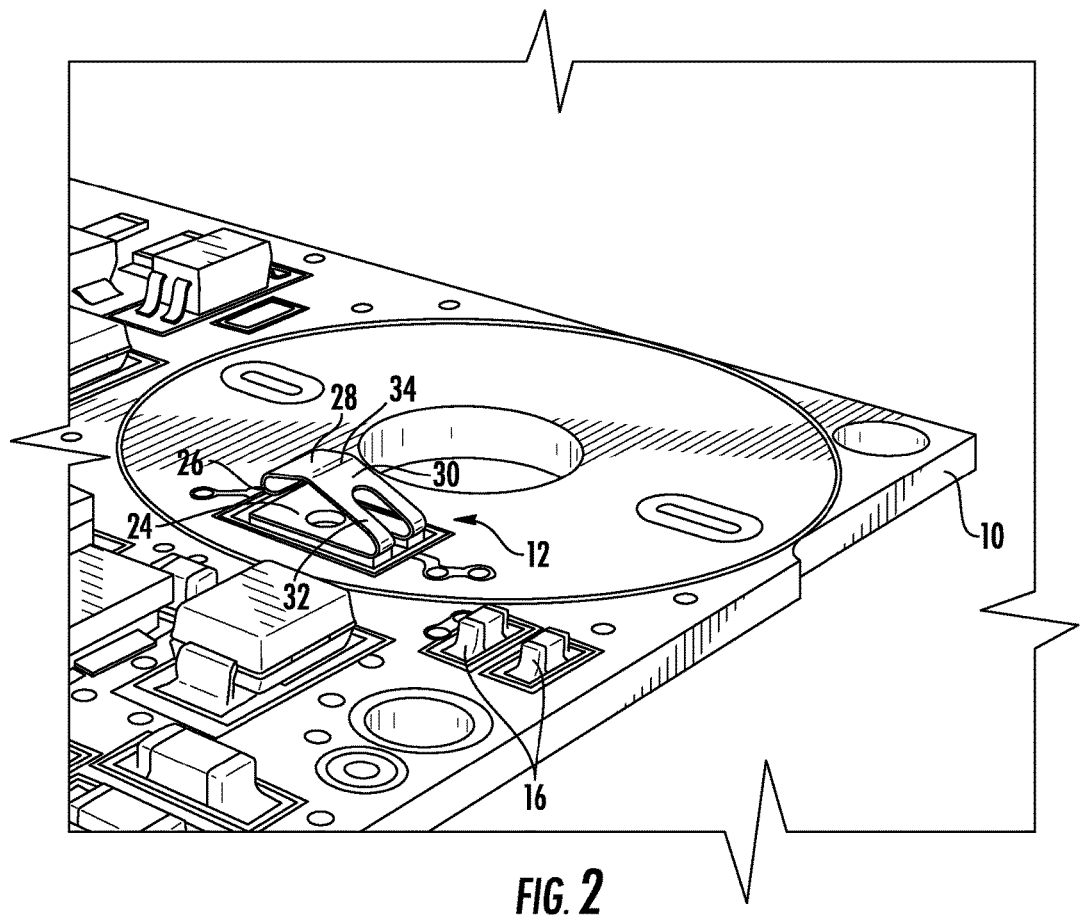
FIG. 2 is another perspective view of the circuit board of FIG. 1.

FIG. 2 is a rear perspective view of the circuit board 10. As shown, the spring contact 12 is coupled to an EMI circuit including a pair of capacitors 16.

Figure 3:
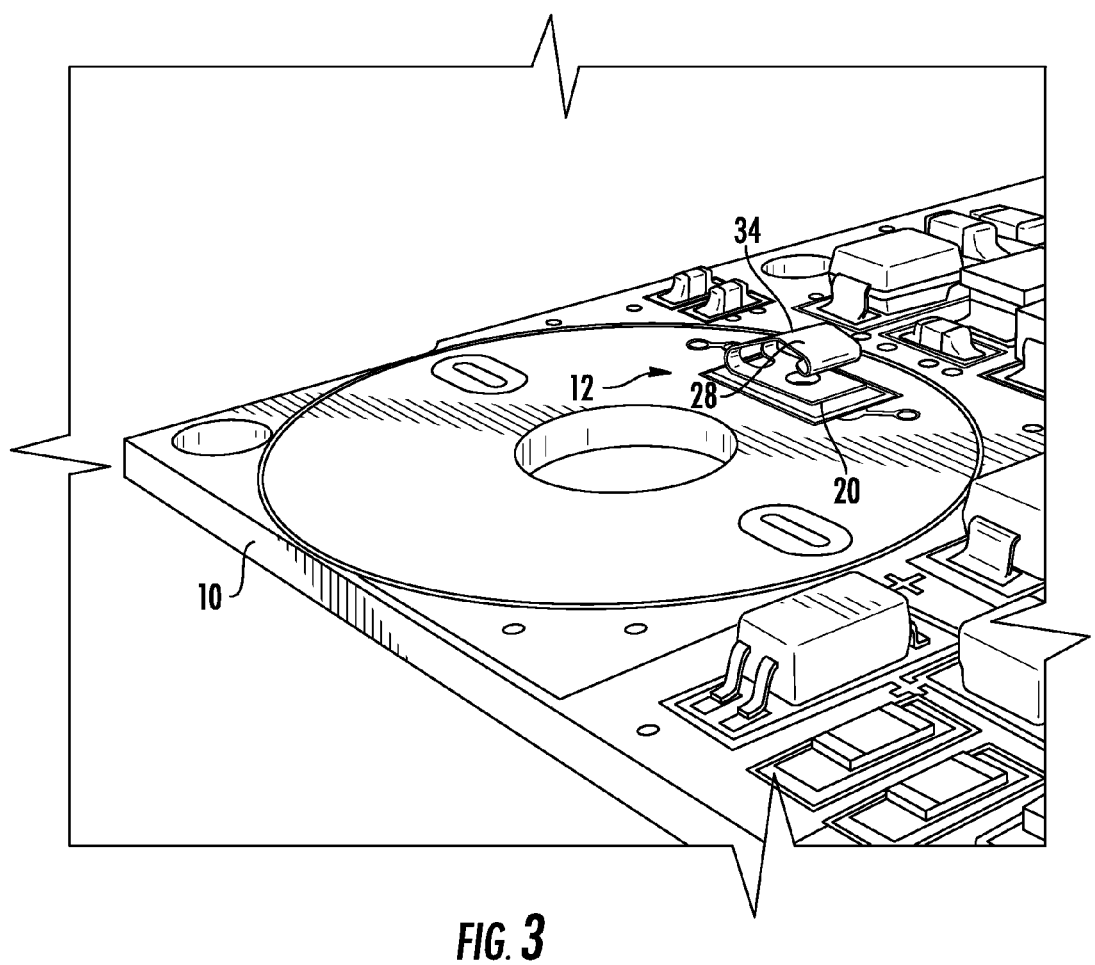
FIG. 3 is another perspective view of the circuit board of FIG. 1.

FIG. 3 is a front right perspective view of the circuit board 10. When no motor is coupled to the circuit board 10 in the motor footprint 14, the second arm of the spring contact 12 is biased upward with a space between the first portion 28 of the second arm and the first arm 24 coupled to the contact 20.

FIG. 4 is an exploded perspective view of the motor 36 and the circuit board 10. The pair of leads 38, the central projection 40, and the peripheral outer rim 44 extend from the bottom 46 of the motor 36. The leads 38 are aligned with the through-hole contacts 18 and the projection 40 is aligned with the central opening 22. FIG. 5 is a perspective view of the motor 36 coupled to the circuit board 10. When the motor 36 is coupled to the circuit board 10, the outer rim 44 rests on top surface of the circuit board 10.

FIG. 6 is a partially broken perspective view of the motor 36 coupled to the circuit board 10. The spring contact 12 is received in a plenum or chamber below the motor 36 defined by the bottom 46, the outer rim 44, and the top surface of the circuit board 10. The chamber has a height that is less than the uncompressed height of the spring contact 12 and the spring contact 12 is therefore brought into contact with the bottom 44 (e.g., along an edge 34).

FIG. 7A is a schematic top view of the circuit board 10 and FIG. 7B is a bottom perspective view of the circuit board 10. The surface contacts 20 on the top surface of the circuit board 10 are connected to conductive paths on the bottom surface of the circuit board including the pair of test points 52. The test points 52 may be used to perform a continuity check or for other testing or tuning purposes.

Figure 8A:
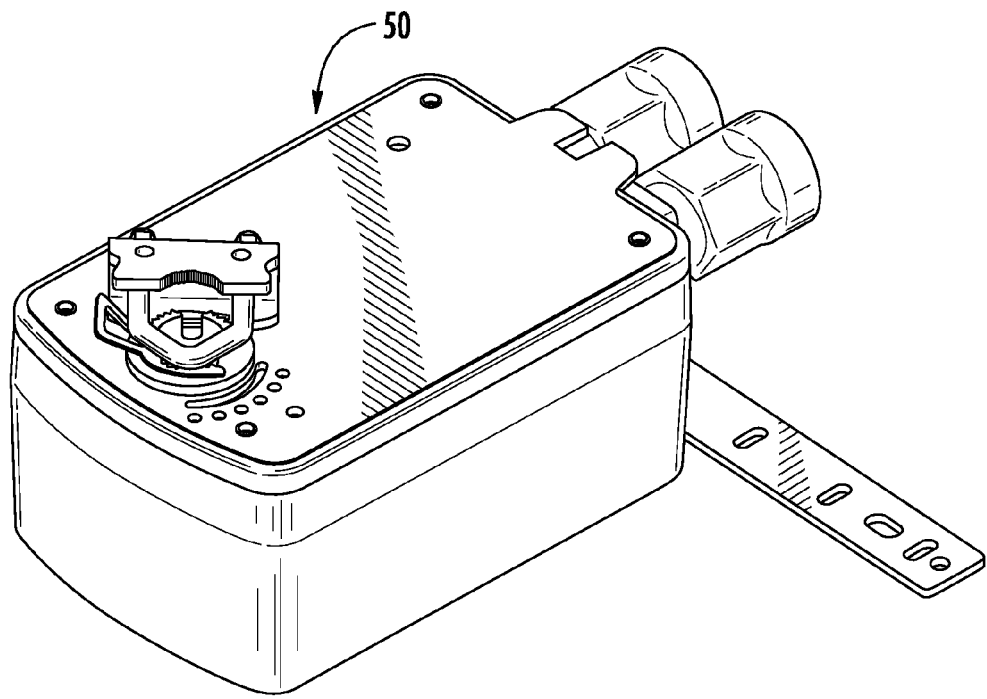
FIG. 8A is a perspective view of an actuator driven by the motor coupled to the circuit board of FIG. 1, in accordance with an exemplary embodiment.
Figure 8B:
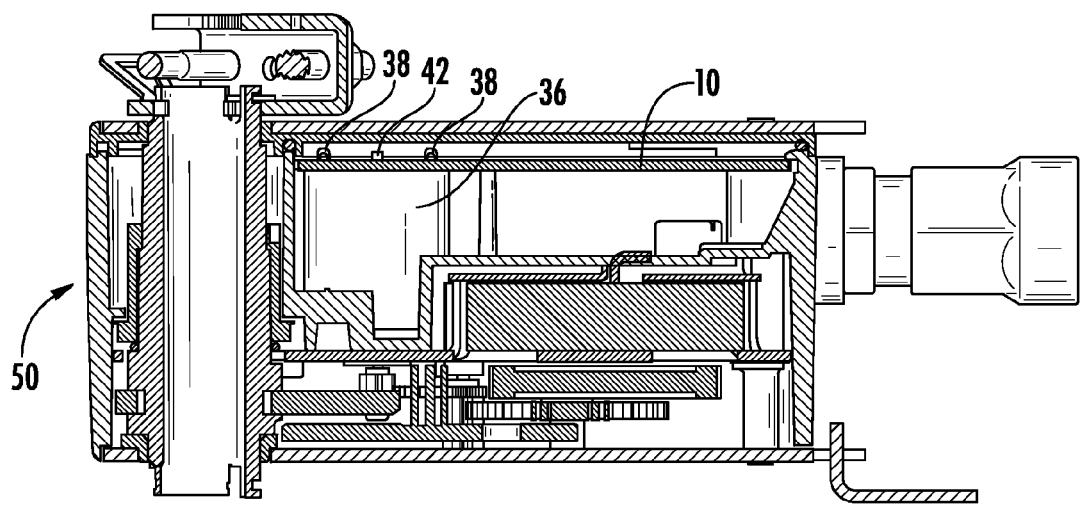
FIG. 8B is a cross-section view of the actuator of FIG. 8A.

FIG. 8A is a perspective view of the actuator 50 driven by the motor 36 and FIG. 8B is a cross-section view of the actuator 50. The motor 36 and the circuit board 10 are contained within the housing of the actuator 50 with the output shaft 42 of the motor 36 engaging the internal mechanism of the actuator 50 (e.g., via a geared connection).

FIG. 9 is a diagram of an exemplary EMI circuit. In one embodiment, the EMI circuit includes two capacitors 16, one with a capacitance of 0.1 µF and another with a capacitance of 0.01 µF and each connected to ground and a spring contact 12 coupled to contacts 20. The motor 36 is coupled to the EMI circuit through the contact between the bottom 44 of the motor 36 and the spring contact 12. The test points 52 are on either side of the spring contact 12.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. It should be understood that the present application is not limited to the details or methodology set forth in the description or illustrated in the figures. It should also be understood that the terminology is for the purpose of description only and should not be regarded as limiting.

What is claimed is:

1. An actuator comprising:
    a circuit board comprising an electromagnetic interference (EMI) reduction circuit;
    a motor comprising a motor casing mounted on the circuit board such that a portion of the motor casing contacts a surface of the circuit board;
    an electrical contact conductively coupled to the EMI reduction circuit and mounted on the surface of the circuit board such that the electrical contact establishes a conductive path between the EMI reduction circuit and the motor casing when the motor casing is mounted on the circuit board; and
    wherein a first portion of the motor casing contacts the electrical contact and the first portion of the motor casing is a surface of the motor casing, and the portion of the motor casing that contacts the surface of the circuit board is a second portion of the motor casing different from the first portion of the motor casing and the second portion of the motor casing is an outer rim that forms a perimeter around the surface of the motor casing.

2. The actuator of claim 1, wherein the electrical contact is a spring contact mounted on the surface of the circuit board such that the motor casing contacts and compresses the spring contact when the motor casing is mounted on the circuit board.

3. The actuator of claim 2, wherein the spring contact comprises a first arm mounted on the surface of the circuit board and a second arm having a first portion and a second portion, the second portion connected to the first arm with a curved spring portion.

4. The actuator of claim 1, wherein the electrical contact extends from the surface of the circuit board and bridges a gap between the first portion of the motor casing and the surface of the circuit board when the motor casing is mounted on the circuit board.

5. The actuator of claim 4, wherein the electrical contact is a spring contact having an uncompressed height that exceeds a height of the gap such that the spring contact is compressed when the motor casing is mounted on the circuit board.

6. The actuator of claim 1, further comprising a housing within which the circuit board, the motor, and the electrical contact are contained.

7. The actuator of claim 1, wherein the circuit board comprises a motor footprint visually defining an area of the circuit board on which the motor casing is mounted.

8. The actuator of claim 7, wherein:
    the circuit board comprises a plurality of through-hole contacts that extend through the circuit board within the motor footprint; and
    the motor comprises a plurality of electrical terminals that fit within the through-hole contacts and electrically couple the motor to the circuit board when the motor casing is mounted on the circuit board.

9. The actuator of claim 1, wherein:
    the circuit board comprises a test point exposed on another surface of the circuit board opposite the surface of the circuit board on which the motor casing and the electrical contact are mounted; and
    the test point is conductively coupled to the EMI reduction circuit and the motor casing when the motor casing is mounted on the circuit board.

10. A circuit board for an actuator, the circuit board comprising:
    an electromagnetic interference (EMI) reduction circuit;
    a surface configured to facilitate mounting a motor casing on the circuit board such that a portion of the motor casing contacts the surface when the motor casing is mounted on the circuit board;
    an electrical contact conductively coupled to the EMI reduction circuit and mounted on a surface of the circuit board such that the electrical contact establishes a conductive path between the EMI reduction circuit and the motor casing when the motor casing is mounted on the circuit board; and
    wherein a first portion of the motor casing contacts the electrical contact and the first portion of the motor casing is a surface of the motor casing, and the portion of the motor casing that contacts the surface of the circuit board is a second portion of the motor casing different from the first portion of the motor casing and the second portion of the motor casing is an outer rim that forms a perimeter around the surface of the motor casing.

11. The circuit board of claim 10, wherein the electrical contact is a spring contact mounted on the surface of the circuit board such that the motor casing contacts and compresses the spring contact when the motor casing is mounted on the circuit board.

12. The circuit board of claim 11, wherein the spring contact comprises a first arm mounted on the surface of the circuit board and a second arm having a first portion and a second portion, the second portion connected to the first arm with a curved spring portion.

13. The circuit board of claim 10, wherein the electrical contact extends from the surface of the circuit board and bridges a gap between the first portion of motor casing and the surface of the circuit board when the motor casing is mounted on the circuit board.

14. The circuit board of claim 13, wherein the electrical contact is a spring contact having an uncompressed height that exceeds a height of the gap such that the spring contact is compressed when the motor casing is mounted on the circuit board.

15. The circuit board of claim 10, wherein the EMI reduction circuit comprises at least one capacitor conductively coupled to a ground plane of the circuit board.

16. The circuit board of claim 10, further comprising a motor footprint visually defining an area of the circuit board on which the motor casing is mounted.

17. The circuit board of claim 16, further comprising a plurality of through-hole contacts that extend through the circuit board within the motor footprint, wherein the through-hole contacts are configured to receive a plurality of electrical terminals of a motor associated with the motor casing and electrically couple the motor to the circuit board when the motor casing is mounted on the circuit board.

18. The circuit board of claim 10, further comprising:
    another surface opposite the surface on which the motor casing and the electrical contact are mounted; and
    a test point exposed on the another surface of the circuit board, wherein the test point is conductively coupled to the EMI reduction circuit and the motor casing when the motor casing is mounted on the circuit board.

* * * * *